(12) United States Patent
Okamoto

(10) Patent No.: US 7,277,249 B2
(45) Date of Patent: Oct. 2, 2007

(54) METHOD OF AND APPARATUS FOR HEAD POSITION CONTROL

(75) Inventor: Makoto Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 10/664,793

(22) Filed: Sep. 19, 2003

(65) Prior Publication Data

US 2004/0114267 A1    Jun. 17, 2004

(30) Foreign Application Priority Data

Sep. 20, 2002    (JP)    ............................. 2002-276087

(51) Int. Cl.
*G11B 21/02*    (2006.01)
(52) U.S. Cl. ..................................... 360/75
(58) Field of Classification Search ............... None
See application file for complete search history.

(56) References Cited

U.S. PATENT DOCUMENTS 5,982,061 A    11/1999    Grantz et al. ............. 310/67

FOREIGN PATENT DOCUMENTS

| JP | 4-276321 | 10/1992 |
|----|----------|---------|
| JP | 6-76330 | 3/1994 |
| JP | 6-351190 | 12/1994 |
| JP | 8-36760 | 2/1996 |
| JP | 8-45169 | 2/1996 |
| JP | 8-045169 | 2/1996 |
| JP | 11-86300 | 3/1999 |
| JP | 11-273235 | 10/1999 |
| JP | 2000-11562 | 1/2000 |
| JP | 2000-67507 | 3/2000 |
| JP | 2000-182343 | 6/2000 |
| JP | 2001-014782 | 1/2001 |
| JP | 2001-126421 | 5/2001 |
| JP | 2002-130265 | 5/2002 |
| JP | 2003-168285 | 6/2003 |

*Primary Examiner*—William Korzuch
*Assistant Examiner*—Mark Blouin
(74) *Attorney, Agent, or Firm*—Greer, Burns & Crain, Ltd.

(57) ABSTRACT

It is judged whether an inclination of a spindle is out of a predetermined range, and a position of a head is controlled so as to compensate for the inclination upon detection that the inclination of the spindle is out of the range. The position of the head is controlled based on a phase correction quantity, based on an amplitude correction quantity, using a repeat control method, or using a compression filter.

30 Claims, 13 Drawing Sheets

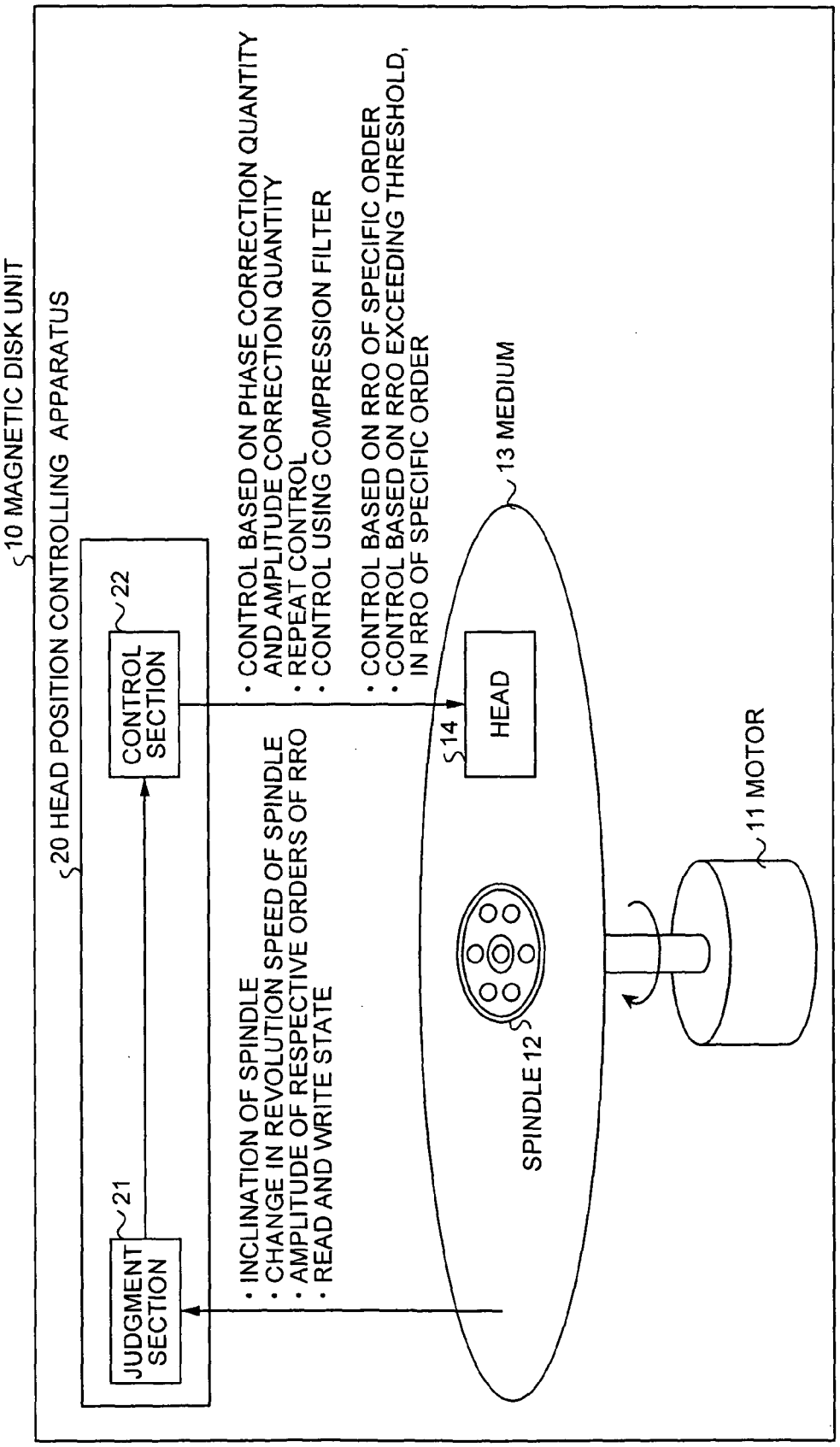

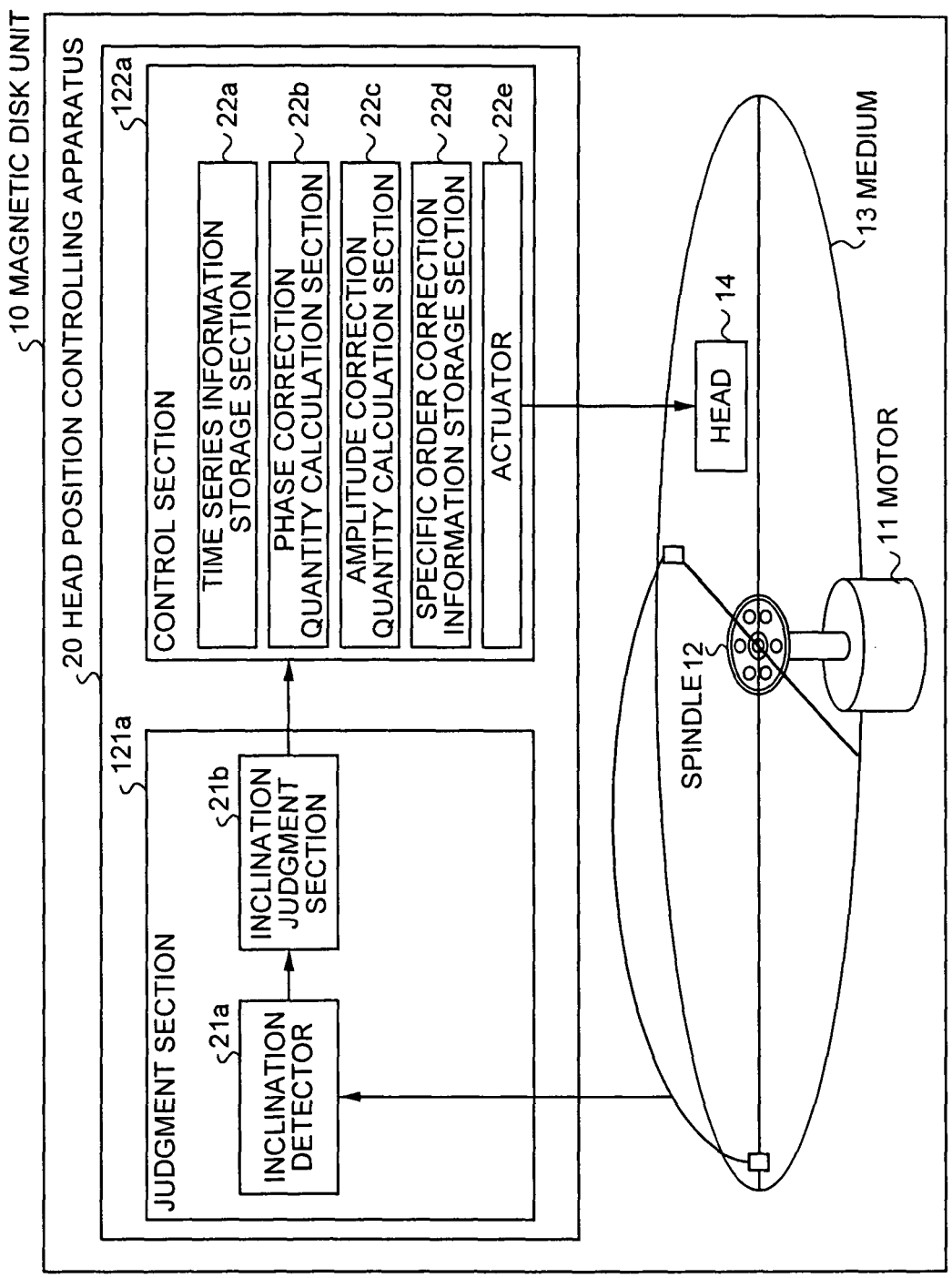

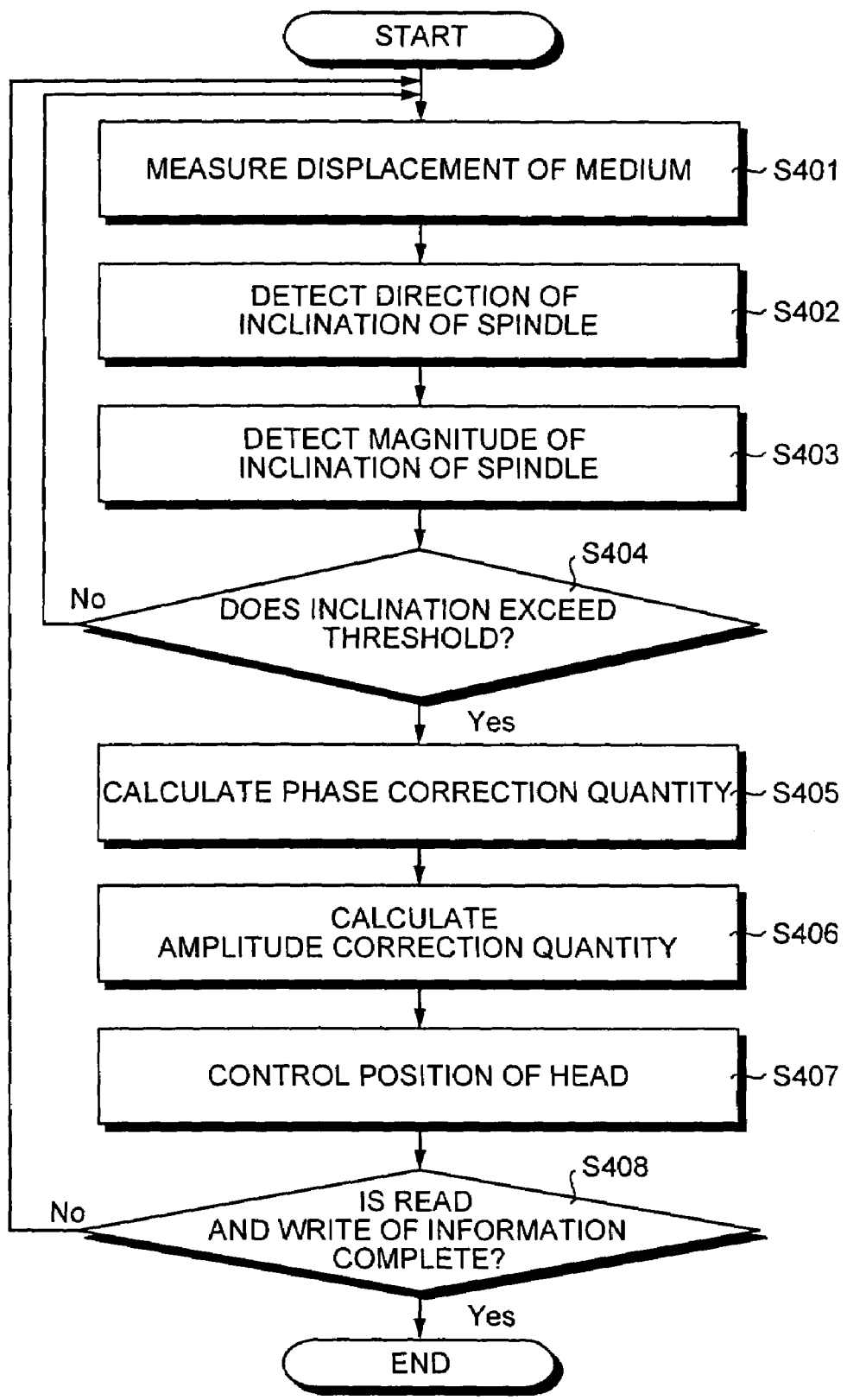

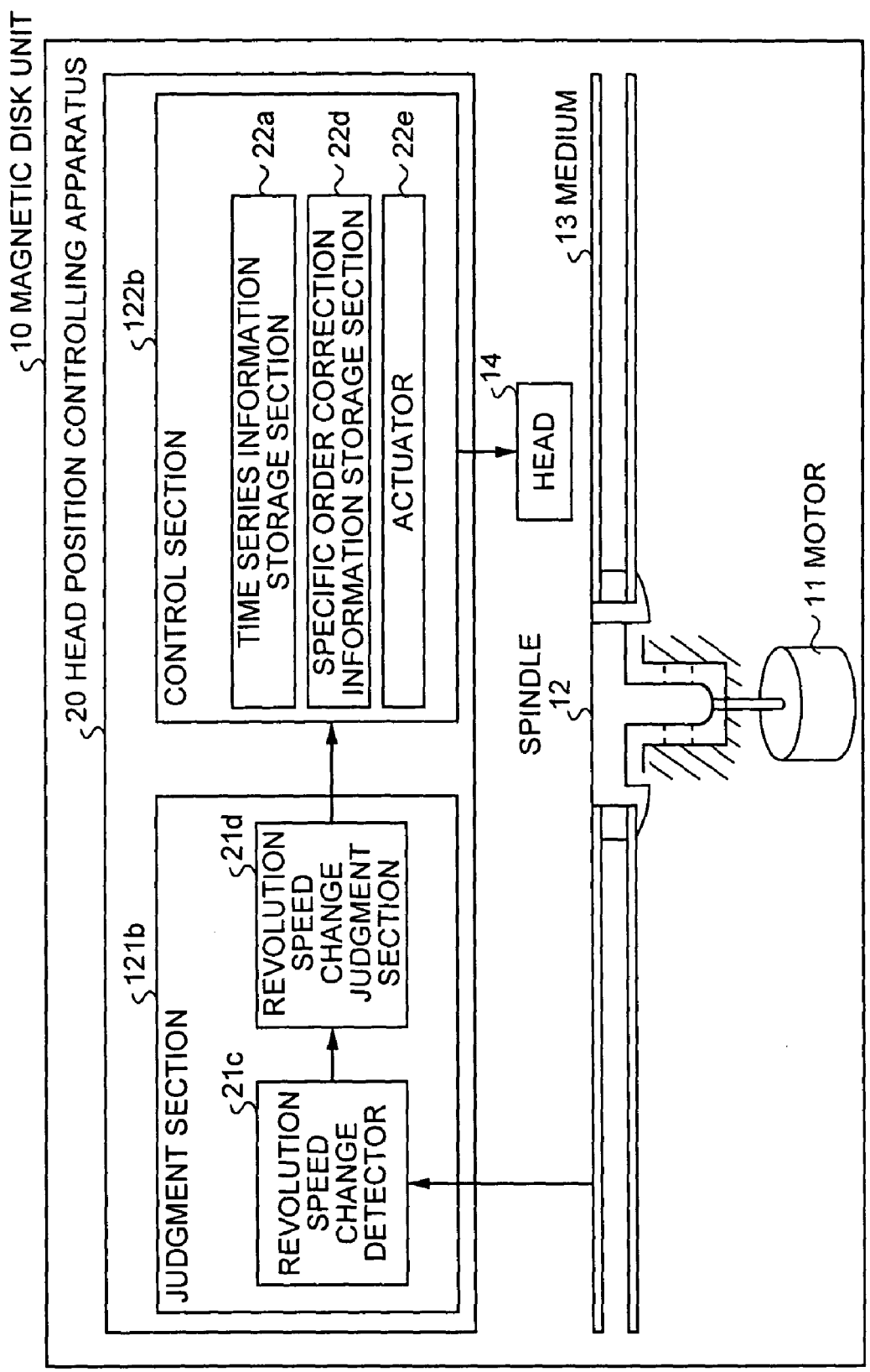

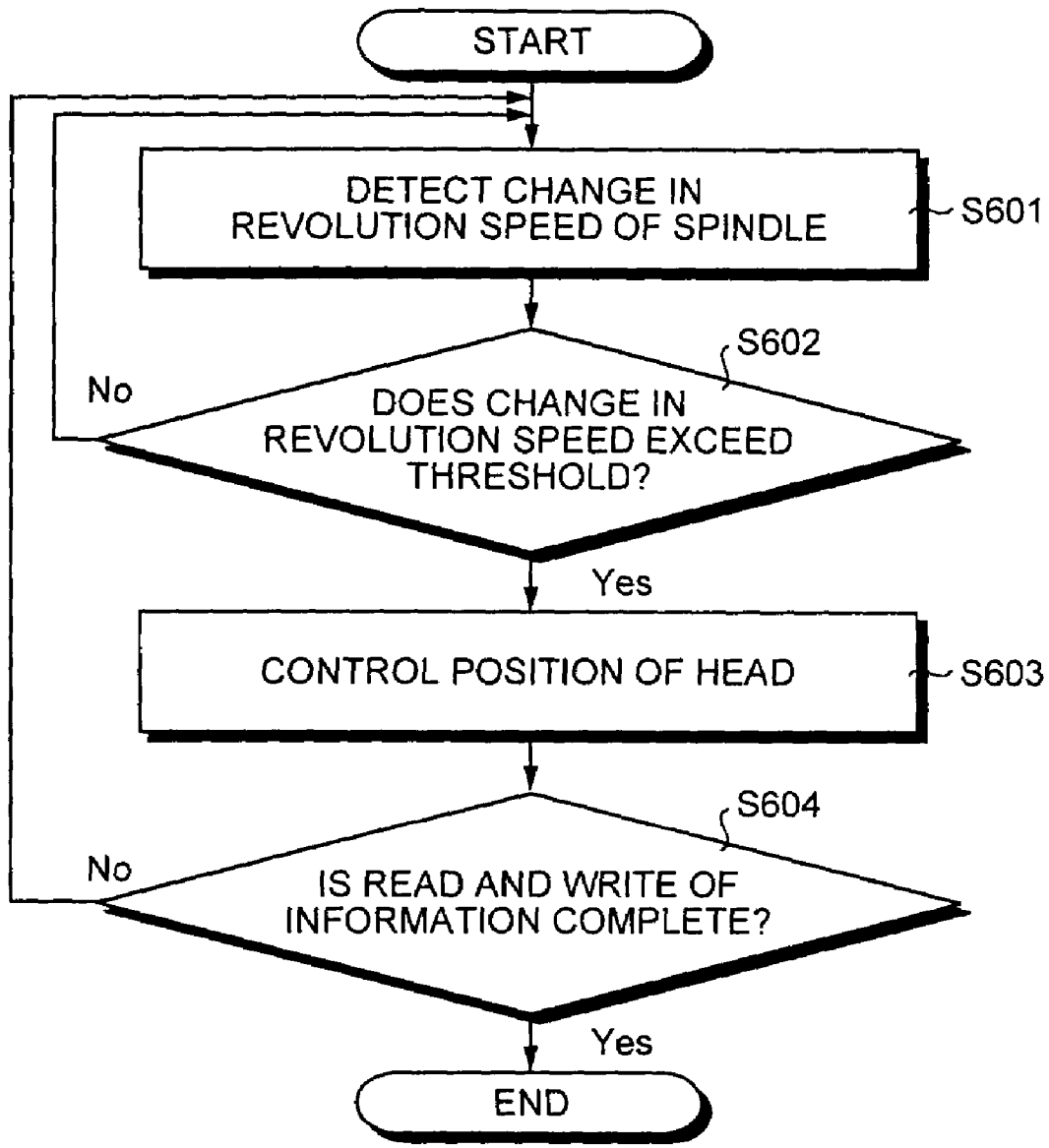

METHOD OF AND APPARATUS FOR HEAD POSITION CONTROL

BACKGROUND OF THE INVENTION

1) Field of the Invention

The present invention relates to a method of and an apparatus for controlling the position of a head for read and write of information with respect to a medium rotated and driven by a spindle having a hydrodynamic bearing.

2) Description of the Related Art

Magnetic disk units are generally used as external memories in the computers. Such magnetic disk units have a head that performs reading or writing of information from or into a magnetic medium (hereinafter, "read-write operation"). A spindle rotates the medium while the head performs the read-write operation. A head position control apparatus controls the position of the head on the medium, while the head performs the read-write operation.

One approach is to use a ball bearing in the spindle. However, the ball bearing produces sound and also increases the non-repeatable runout. One approach to solve these problems is to use a hydrodynamic bearing instead of a ball bearing.

FIG. 13 is a block diagram of a conventional magnetic disk unit. A spindle 12 having a hydrodynamic bearing rotates a medium 13. A motor 11 drives the spindle 12. A head 14 performs the read-write operation with respect to the medium 13. A head position control apparatus 30 controls the position of the head 14 on the medium 13. The head position control apparatus 30 even absorbs the vibrations, which are produced due to rotation of the medium 13, when positioning the head 14 on the medium 13. Such a magnetic disk unit has been disclosed, for example, in Japanese Patent Application Laid-Open No. 08-45169 (see pages 3 and 4, FIGS. 1 and 2).

The vibrations of the medium 13 include RRO of the spindle in a low frequency region, and periodic RRO of the spindle due to the eccentricity of the axis of rotation of the spindle 12 and motor 11. The head position control apparatus 30 compensates for these vibrations by performing an RRO correction.

The RRO correction can be performed by various ways. One approach is low frequency compression. In the low frequency compression, a low frequency component of the RRO of the spindle is compressed using a compression filter. Another approach is amplitude control. In the amplitude control, a repeat control (feedforward control) performed with respect to the periodic RRO of the spindle.

However, the conventional RRO correction has problems in that only the vibrations mentioned above can be compensated. In magnetic disk units, however, a gyroscopic moment is generated when the spindle rotates; and such gyroscopic moment causes vibrations. The conventional RRO correction has a drawback that the vibrations resulting from the gyroscopic moment cannot be eliminated.

Thus, if ball bearing is used, sound is produced and also there is an increase in the non-repeatable runout. On the other hand, if the hydrodynamic bearing is used, there are vibrations, resulting from the gyroscopic moment, that can not be corrected.

SUMMARY OF THE INVENTION

It is an object of this invention to at least solve the problems in the conventional technology.

A head position control apparatus according to one aspect of the present invention controls a position of a head that performs read and write of information with respect to a medium rotated and driven by a spindle. The spindle includes a hydrodynamic bearing. The head position control apparatus includes a judgment unit that judges whether gyroscopic moment of the spindle is out of a predetermined range; and a control unit that controls the position of the head to compensate for the inclination of the spindle upon a judgment by the judgment unit that the gyroscopic moment is out of the predetermined range.

A method according to another aspect of the present invention includes controlling a position of a head that performs read and write of information with respect to a medium rotated and driven by a spindle. The spindle includes a hydrodynamic bearing. The method including judging whether gyroscopic moment of the spindle is out of a predetermined range; and controlling the position of the head to compensate for the inclination of the spindle upon a judgment at the judging that the gyroscopic moment is out of the predetermined range.

A computer program according to still another aspect of the present invention realizes the method of controlling a position of a head on a computer.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 illustrates a functional block diagram of a magnetic disk unit according to an embodiment of the present invention;

FIG. 3 is a block diagram of a magnetic disk unit according to a first embodiment of the present invention;

FIG. 4 is a flowchart of a head position control process according to the first embodiment;

FIG. 5 is a block diagram of a magnetic disk unit according to a second embodiment of the present invention;

FIG. 6 is a flowchart of a head position control process according to the second embodiment;

DETAILED DESCRIPTION

Figure 2A:
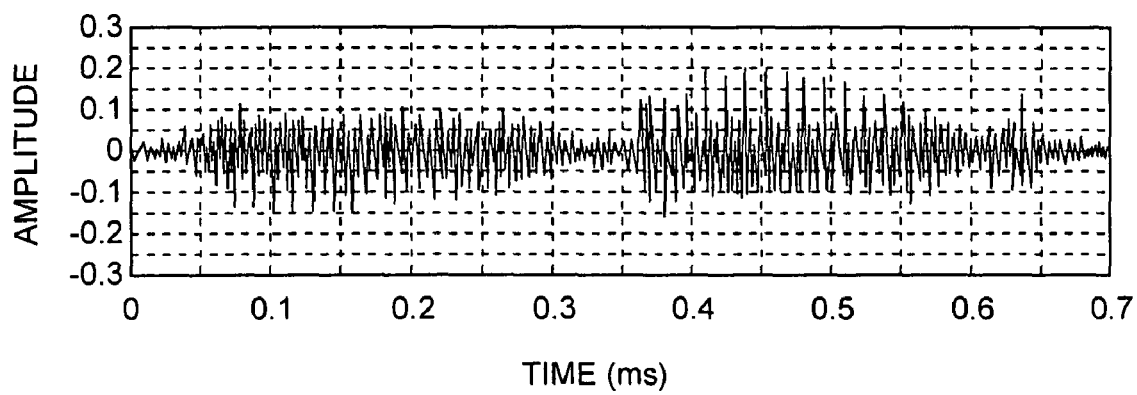
FIG. 2A illustrates a waveform of a position error signal, when a spindle has a hydrodynamic bearing.

Exemplary embodiments of a method, an apparatus, and a computer program for controlling a position of a head according to the present invention will be explained in detail below while referring to the accompanying drawings.

FIG. 1 illustrates a functional block diagram of a magnetic disk unit 10 according to an embodiment of the present invention. The magnetic disk unit 10 includes a head position control apparatus 20. The head position control apparatus 20 controls the position of the head 14 on the medium 13 when performing the read-write operation. The spindle 12 holds the medium 13. The motor 11 drives the spindle 12. The spindle 12 includes a not shown hydrodynamic bearing.

Since the spindle 12 includes a hydrodynamic bearing, a gyroscopic moment is generated due to the oscillation of the magnetic disk unit 10 and the rotation of the spindle 12. The spindle 12 and the medium 13 incline and vibrate due to the gyroscopic moment. Inclination and vibrations of the medium 13 cause incorrect positioning of the head 14 on the medium 13 during the read-write operation. As a result, reading or writing of information from or into the medium 13 can not be performed as desired. To solve this problem, the head position control apparatus 20 according to the present invention has an arrangement to compensate for the inclination or the vibrations generated due to the gyroscopic moment of the spindle 12 and the medium 13.

The head position control apparatus 20 includes a judgment section 21 that judges whether the gyroscopic moment is out of a predetermined range. The judgment section 21 makes this judgment based on various parameters. These parameters include an inclination of the spindle 12, a change in the revolution speed of the spindle 12, an amplitude of the respective orders in RRO of the spindle, and a read and write state (i.e., whether read-write operation is possible). When the gyroscopic moment is out of a predetermined range, a control section 22 controls the position of the head 14 to compensate for the inclination of the spindle 12 and the medium 13.

Figure 2B:
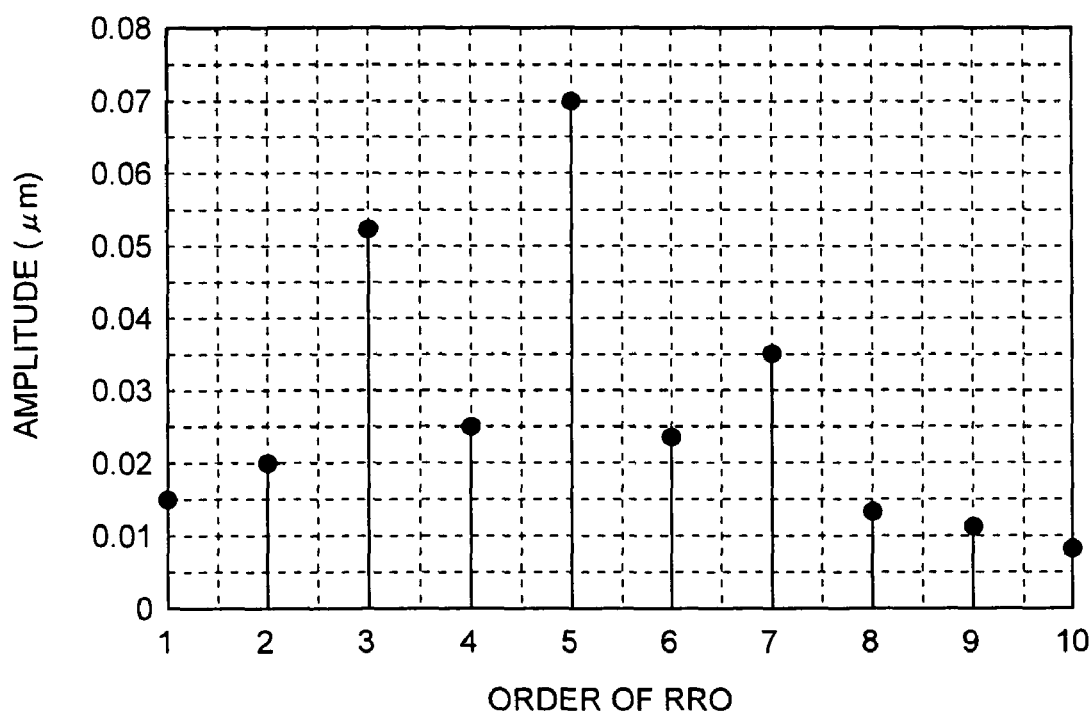
FIG. 2B illustrates amplitudes of the first order to the ninth order of the RRO of the spindle.

The characteristic of vibrations due to the gyroscopic moment is such that when there is a gyroscopic moment, the RRO of one or a plurality of specific orders particularly deteriorates. FIG. 2A illustrates a waveform of a position error signal when there is a gyroscopic moment. FIG. 2B illustrates amplitudes, which are obtained by subjecting the position error signal in FIG. 2A to DFT (discreet Fourier transform), of the first to the ninth order of the RRO of the spindle. It can be clearly noticed that the third, fifth, and seventh orders have undergone deterioration. It is known that the characteristic of the vibration (RRO) due to the gyroscopic moment is determined only by the bearing structure of the spindle, and does not depend on the magnitude and the direction of the gyroscopic moment.

Therefore, the head position control apparatus 20 judges whether the gyroscopic moment is out of the predetermined range, and the control section 22 controls the position of the head 14 to compensate for the inclination of the spindle 12 and the medium 14. As a result, it becomes possible to compensate the inclination and the vibrations arising from the gyroscopic moment.

A first embodiment of the present invention relates to controlling a position of the head based on the phase correction quantity and the amplitude correction quantity.

FIG. 3 illustrates the magnetic disk unit 10 according to the first embodiment. This magnetic disk unit 10 includes the head position control apparatus 20. The head position control apparatus 20 includes a judgment section 121a and a control section 122a. The judgment section 121a detects the inclination of the spindle 12. If this inclination exceeds a predetermined threshold, the judgment section 121a judges that there is a great gyroscopic moment. The judgment section 121a includes an inclination detector 21a and an inclination judgment section 21b.

The inclination detector 21a detects the inclination of the spindle 12. Specifically, the inclination detector 21a measures a displacement (floatation quantity) of the medium 13 using two or more not shown displacement sensors installed in the magnetic disk unit 10. The direction and the magnitude of inclination of the spindle 12 are detected using the displacement measured at at least two points to have accurate results.

The inclination judgment section 21b judges that the gyroscopic moment is out of the predetermined range when the inclination of the spindle 12 exceeds the predetermined threshold.

The control section 122a controls the position of the head 14 on the medium 13 based on the phase correction quantity and the amplitude correction quantity, when the inclination judgment section 21b judges that the gyroscopic moment is out of the predetermined range. Specifically, the control section 22 controls the position of the head to compensate for the inclination of the spindle 12. The control section 22 includes a time series information storage section 22a, a phase correction quantity calculation section 22b, an amplitude correction quantity calculation section 22c, a specific order correction information storage section 22d, and an actuator 22e.

The time series information storage section 22a stores the basic RRO, which are obtained by performing a predetermined oscillation test in advance, of the spindle. Specifically, since the component synchronous to the rotation of the spindle is to be corrected, the RRO of the spindle for one round (for the number of servo frames) is obtained by the oscillation test and stored in the time series information storage section 22a.

The phase correction quantity calculation section 22b calculates the phase correction quantity corresponding to the basic RRO stored in the time series information storage section 22a, using the direction of inclination of the spindle detected by the inclination detector 21a. For example, vibrations include outward trip and way back, and the gyroscopic moment is produced in the opposite direction in the outward trip and way back. As a result, the phase of the basic RRO of the spindle must be adjusted by 180 degrees.

The amplitude correction quantity calculation section 22c calculates the amplitude correction quantity corresponding to the basic RRO stored in the time series information storage section 22a, using the inclination of the spindle detected by the inclination detector 21a. Specifically, to calculate the amplitude correction quantity, the basic RRO of the spindle is multiplied by a gain corresponding to the inclination of the spindle equal to oscillating angular velocity of the gyroscopic moment.

The specific order correction information storage section 22d stores specific orders, which affects read and write of information from or into the medium 13, of the RRO. Specifically, amplitudes of the specific orders are stored. The specific orders are determined in advance by conducting the predetermined oscillation test.

The actuator 22e adds the phase correction quantity and the amplitude correction quantity to the basic RRO and controls the head 14 based on a value obtained as the result of the addition. This causes the gyroscopic moment of the spindle 12 and the medium 13 to be compensated.

FIG. 4 is a flowchart of a head position control process executed by the head position control apparatus 20 according to the first embodiment. The inclination detector 21a measures the displacement of the medium 13 using two or more displacement sensors (step S401). The inclination detector 21a detects the direction (step S402) and magnitude (step S403) of inclination of the spindle 12 based on the displacement of the medium 13 measured at at least the two points.

The inclination judgment section 21b judges whether the inclination of the spindle exceeds the predetermined threshold (step S404). If the inclination judgment section 21b judges that the inclination of the spindle does not exceed the predetermined threshold (No at step S404), process at steps S401 to S403 is repeated.

If the inclination judgment section 21b judges that the inclination of the spindle exceeds the predetermined threshold (Yes at step S404), the phase correction quantity calculation section 22b calculates the phase correction quantity with respect to the basic RRO, which are stored in the time series information storage section 22a, using the direction of inclination of the spindle detected by the inclination detector 21a (step S405). For example, since vibrations include outward trip and way back, and the gyroscopic moment exists in the opposite direction in the outward trip and way back, the phase of the basic RRO of the spindle must be adjusted by 180 degrees.

The amplitude correction quantity calculation section 22c calculates the amplitude correction quantity with respect to the basic RRO, which are stored in the time series information storage section 22a, using the inclination of the spindle detected by the inclination detector 21a (step S406). Specifically, the amplitude correction quantity is calculated by multiplying the basic RRO of the spindle by the gain corresponding to the inclination of the spindle equal to oscillating angular velocity of the gyroscopic moment.

The actuator 22e controls the position of the head 14 on the medium 13 based on a value obtained by adding the phase correction quantity and the amplitude correction quantity to the basic RRO (step S407). The basic RRO are stored in the specific order correction information storage section 22d.

If the read-write operation is complete (Yes at step S408), the process is terminated. If the read-write operation is to be continued (No at step S408), the process at steps S401 to S407 is repeated.

Thus, if the inclination of the spindle 12 exceeds the predetermined threshold, the position of the head 14 on the medium 13 is controlled based on a value obtained by adding the phase correction quantity and the amplitude correction quantity to the basic RRO of the spindle. As a result, the head 14 can be positioned at an appropriate position on the medium 13 irrespective of the gyroscopic moment of the spindle 12 and the medium 13.

A second embodiment of the present invention relates to controlling the position of the head using a repeat control or a compression filter if a change in the revolution speed of the spindle exceeds a predetermined threshold.

FIG. 5 illustrates the magnetic disk unit 10 according to the second embodiment. This magnetic disk unit 10 includes the head position control apparatus 20. The head position control apparatus 20 includes a judgment section 121b and a control section 122b.

The judgment section 121b detects a change in the revolution speed of the spindle 12. If the change in the revolution speed of the spindle 12 exceeds a predetermined threshold, the judgment section 121b judges that the gyroscopic moment is out of a predetermined range. The judgment section 121b includes a revolution speed change detector 21c and a revolution speed change judgment section 21d.

The revolution speed change detector 21c detects a change, caused due to the gyroscopic moment, in the revolution speed of the medium 13. Specifically, the change in the revolution speed of the spindle is detected based on not shown servo mark (index signal) on the medium 13. The revolution speed change judgment section 21d judges that the gyroscopic moment is out of the predetermined range, if the change in the revolution speed of the spindle exceeds the predetermined threshold.

The control section 122b controls the position of the head 14 on the medium 13 based on the repeat control or a compression filter, when the revolution speed change judgment section 21d judges that the gyroscopic moment is out of the predetermined range. The control section 122b includes the time series information storage section 22a, the specific order correction information storage section 22d, and the actuator 22e. The time series information storage section 22a and the specific order correction information storage section 22d respectively have same functions as in the first embodiment. The actuator 22e carries out the repeat control or uses the compression filter to control the position of the head 14 on the medium 13.

FIG. 6 is a flowchart of a head position control process executed by the head position control apparatus 20 according to the second embodiment. The revolution speed change detector 21c detects a change in the revolution speed of the spindle 12 (step S601). Specifically, the change in the revolution speed of the spindle is detected using the servo mark provided on the medium 13.

The revolution speed change judgment section 21d judges whether the change in the revolution speed of the spindle exceeds the predetermined threshold (step S602). If the revolution speed change judgment section 21d judges that the change in the revolution speed does not exceed the predetermined threshold (No at step S602), the process at step S601 is repeated.

If the revolution speed change judgment section 21d judges that the change in the revolution speed exceeds the predetermined threshold (Yes at step S602), the actuator 22e controls the position of the head 14 on the medium 13 by carrying out the repeat control or by using the compression filter (step S603).

If the read-write operation is complete (Yes at step S604), the process is terminated. If the read-write operation is to be continued (No at step S604), the process at steps S601 to S603 is repeated.

Thus, if the change in the revolution speed of the spindle exceeds the predetermined threshold, the position of the head 14 on the medium 13 is controlled by carrying out the repeat control or by using the compression filter. As a result, the head 14 can be positioned at an appropriate position on the medium 13 irrespective of the gyroscopic moment of the spindle 12 and the medium 13.

A third embodiment of the present invention relates to controlling the position of the head by carrying out the repeat control or by using the compression filter, if the amplitude of the specific orders exceeds a predetermined threshold.

Figure 7:
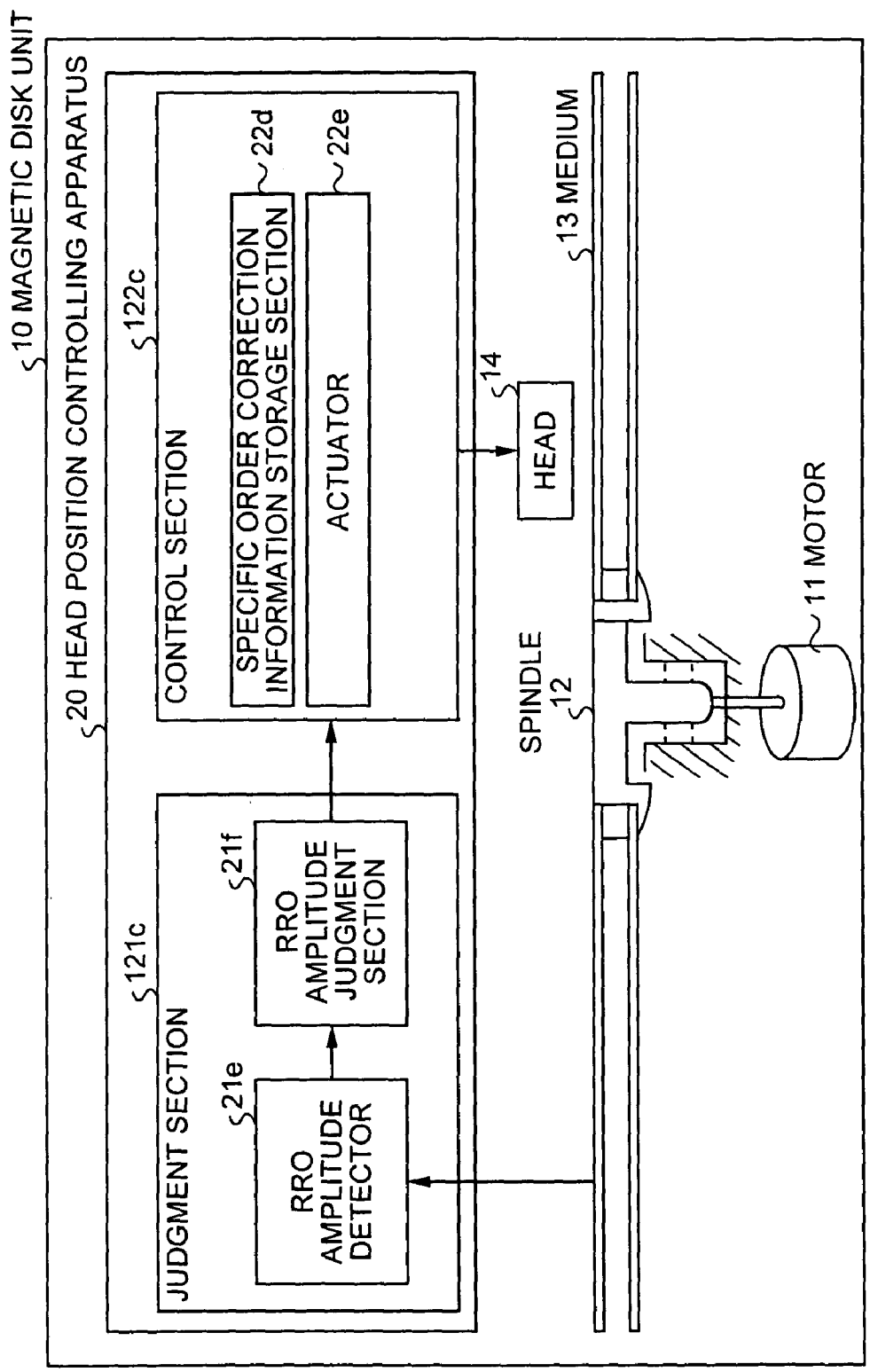
FIG. 7 is a block diagram of a magnetic disk unit according to a third embodiment of the present invention.

FIG. 7 illustrates the magnetic disk unit 10 according to the third embodiment. This magnetic disk unit 10 includes the head position control apparatus 20. The head position control apparatus 20 includes a judgment section 121c and a control section 122c.

The judgment section 121c detects the amplitude of the respective orders in RRO of the spindle. If the amplitude of a specific order exceeds a predetermined threshold, the judgment section 121c judges that the gyroscopic moment is out of the predetermined range. The judgment section 121c includes an RRO amplitude detector 21e and an RRO amplitude judgment section 21f.

The RRO amplitude detector 21e detects the amplitude of the respective orders in RRO of the spindle. Specifically, the RRO amplitude detector 21e measures the time base waveform of the position error signal waveform from a servo position information. The RRO amplitude detector 21e then subjects the time base waveform to the DFT, to detect the phase of the RRO of the spindle and the amplitude of the respective orders. The RRO amplitude judgment section 21f judges that the gyroscopic moment is out of the predetermined range if the amplitude of the specific order exceeds the predetermined threshold.

The control section 122c controls the position of the head 14 on the medium 13 by carrying out the repeat control or by using the compression filter, when the RRO amplitude judgment section 21f judges that the gyroscopic moment is out of the predetermined range. The control section 22 includes the specific order correction information storage section 22d and the actuator 22e. Since the time series information of the basic RRO of the spindle can be calculated from the amplitude and phase of the respective orders in the RRO of the spindle, it is not necessary to provide the time series information storage section 22a. The specific order correction information storage section 22d has same functions as in the first embodiment. The actuator 22e carries out the repeat control or uses the compression filter to control the position of the head 14 on the medium 13.

Figure 8:
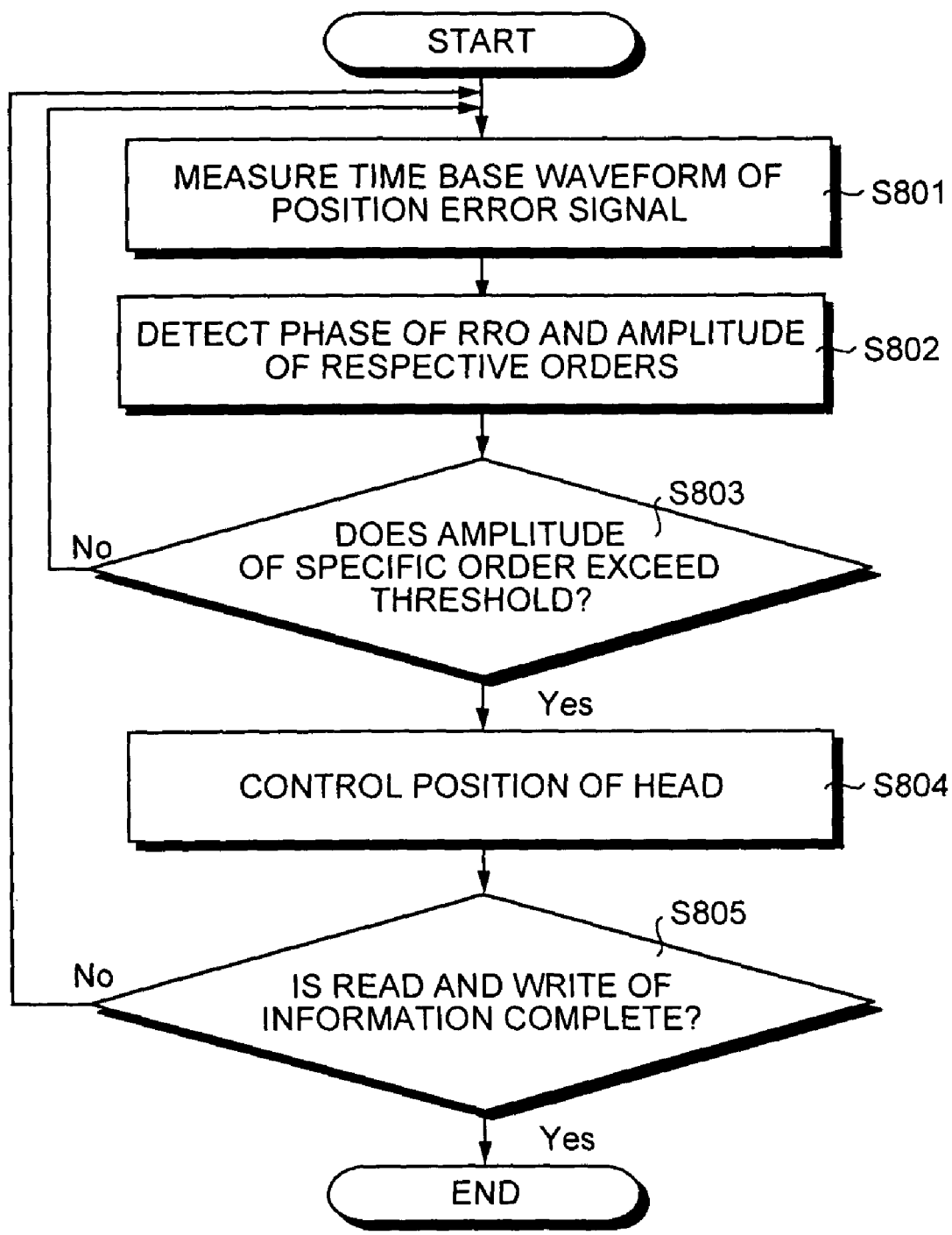
FIG. 8 is a flowchart of a head position control process according to the third embodiment.

FIG. 8 is a flowchart of a head position control process executed by the head position control apparatus 20 according to the third embodiment. The RRO amplitude detector 21e measures the time base waveform of the position error signal waveform from the servo position information (step S801). The RRO amplitude detector 21e subjects the time base waveform in the position error signal information to DFT, to detect the phase of the RRO and the amplitude of the respective orders (step S802).

The RRO amplitude judgment section 21f judges whether the amplitude of the specific order, which affects read and write of information from or into the medium 13, exceeds the predetermined threshold (step S803). If the RRO amplitude judgment section 21f judges that the amplitude of the specific order does not exceed the predetermined threshold (No at step S803), the process at steps S801 and S802 is repeated.

If the RRO amplitude judgment section 21f judges that the amplitude of the specific order exceeds the predetermined threshold (Yes at step S803), the actuator 22e controls the position of the head 14 on the medium 13 by carrying out the repeat control or by using the compression filter (step S804).

If the read-write operation is complete (Yes at step S805), the processing is terminated. If the read-write operation is to be continued (No at step S805), the process at steps S801 to S804 is repeated.

Thus, if the amplitude of the specific order exceeds the predetermined threshold, the position of the head 14 on the medium 13 is controlled by carrying out the repeat control or by using the compression filter. As a result, the head 14 can be positioned at an appropriate position on the medium 13 irrespective of the gyroscopic moment of the spindle 12 and the medium 13.

A fourth embodiment of the present invention relates to controlling the position of the head by carrying out the repeat control or by using the compression filter, if the read-write operation is not possible, and if a state that the read-write operation is not possible occurs repetitively in a predetermined cycle.

Figure 9:
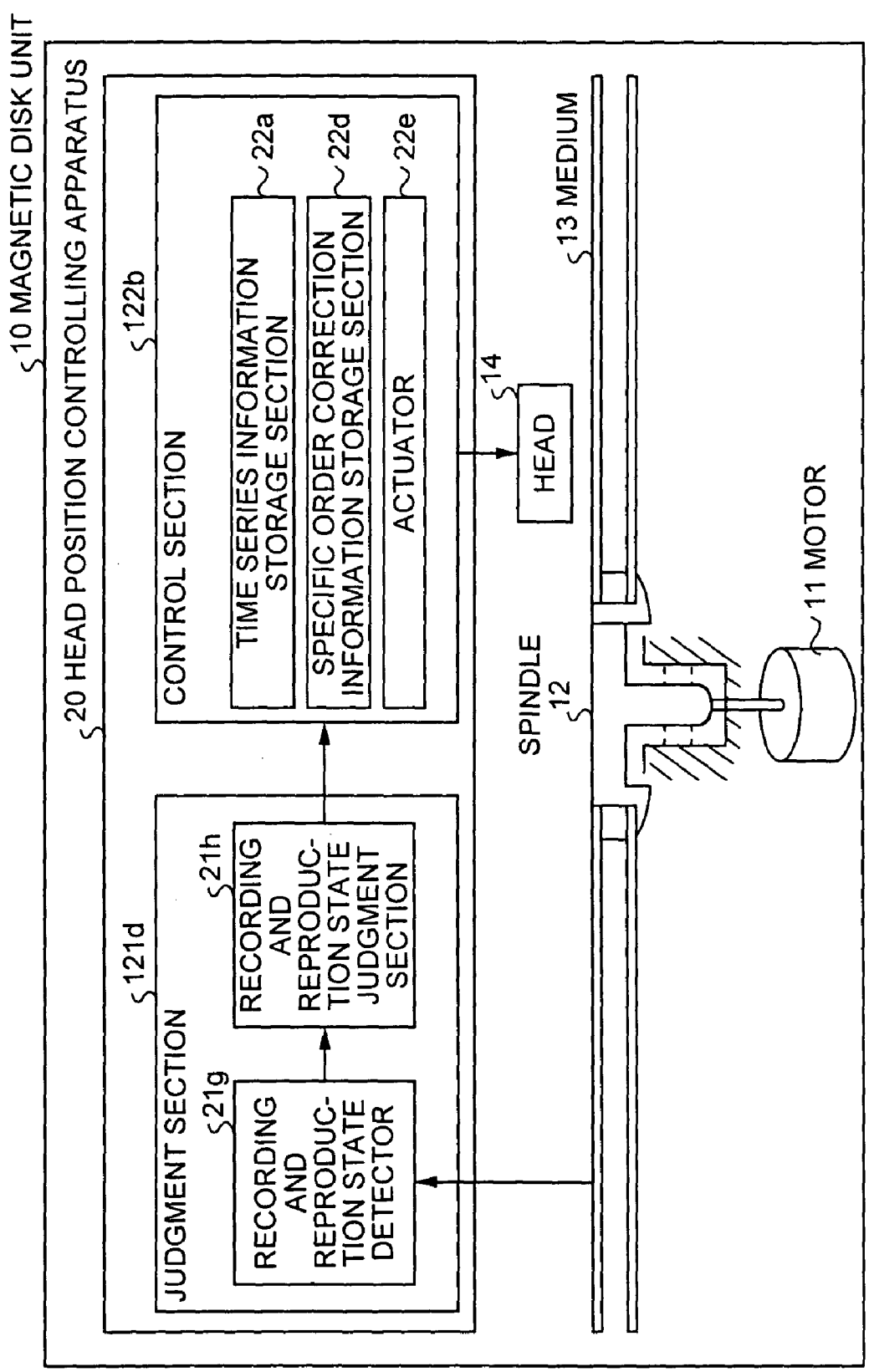
FIG. 9 is a block diagram of a magnetic disk unit according to a fourth embodiment of the present invention.

FIG. 9 illustrates the magnetic disk unit 10 according to the fourth embodiment. This magnetic disk unit 10 includes the head position control apparatus 20. The head position control apparatus 20 includes a judgment section 121d and the control section 122b. Thus, the control section 122b has same functions as in the second embodiment.

The judgment section 121d judges that the gyroscopic moment is out of a predetermined range, the read-write operation is not possible, and if a state that the read-write operation is not possible occurs repetitively in a predetermined cycle. The judgment section 121d includes a recording and reproduction state detector 21g and a recording and reproduction state judgment section 21h.

The recording and reproduction state detector 21g detects whether read-write operation is possible.

The recording and reproduction state judgment section 21h judges whether the read-write operation becomes impossible periodically. Specifically, if the state that the read-write operation is not possible occurs periodically, it indicates that since in the vibration due to the gyroscopic moment, oscillating angular velocity is inversed in the outward trip and way back, a point where the oscillating angular velocity becomes zero always exists between the outward trip and way back. Therefore, the RRO decreases before and after this point, and read-write operation becomes possible.

Figure 10:
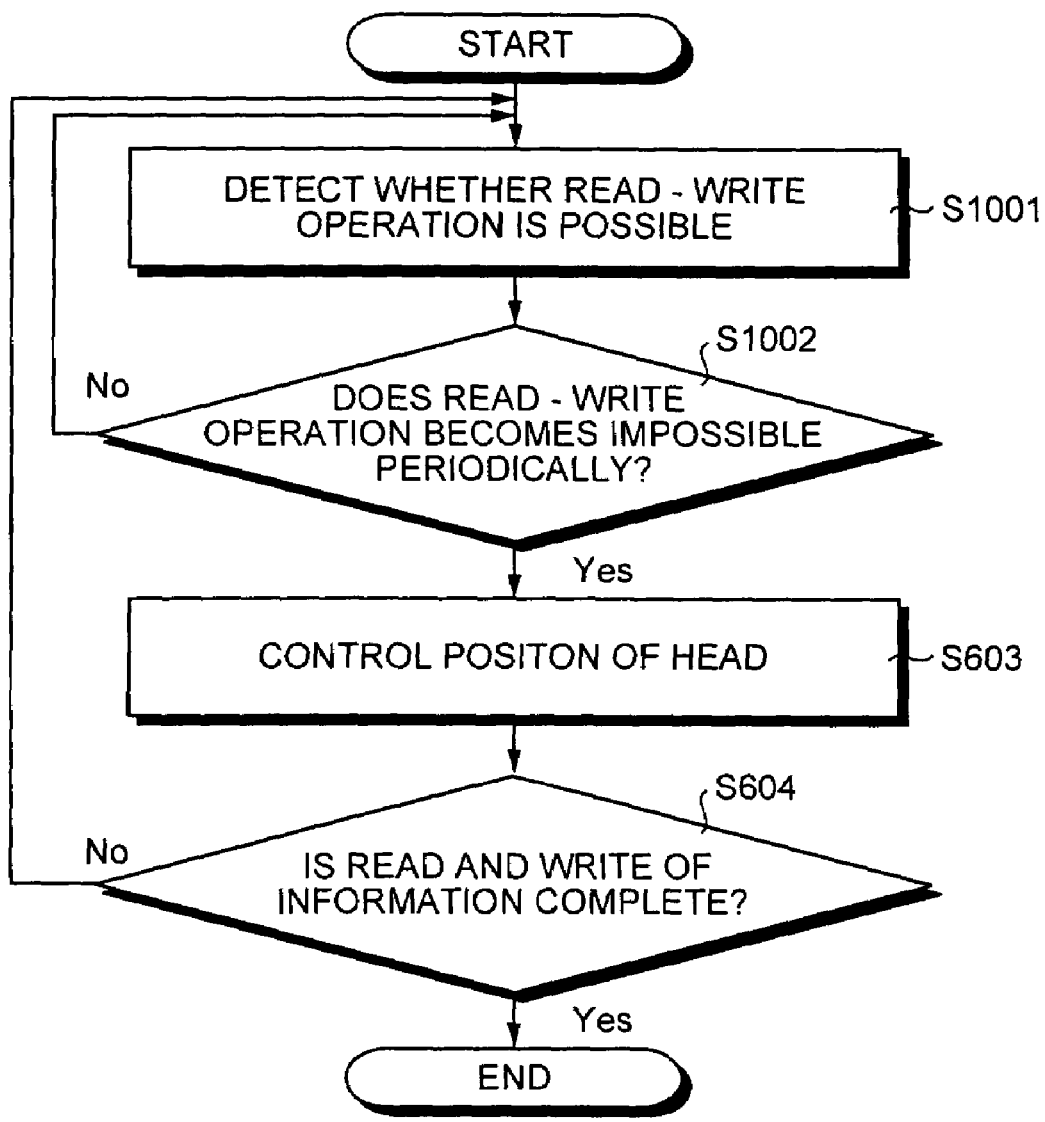
FIG. 10 is a flowchart of a head position control process according to the fourth embodiment.

FIG. 10 is a flowchart of a head position control process executed by the head position control apparatus 20 according to the fourth embodiment. The recording and reproduction state detector 21g detects whether the read-write operation is possible (step S1001). The recording and reproduction state judgment section 21h judges whether read-write operation becomes impossible periodically (step S1002). If the recording and reproduction state judgment section 21h judges that read-write operation becomes impossible periodically, then the process at steps S603 and S604 is performed.

Thus, if read-write operation becomes impossible periodically, the position of the head 14 on the medium 13 is controlled by carrying out the repeat control or using the compression filter. As a result, the head 14 can be positioned at an appropriate position on the medium 13 irrespective of the gyroscopic moment of the spindle 12 and the medium 13.

A fifth embodiment of the present invention relates to controlling the position of the head by carrying out the repeat control or by using the compression filter, if read-write operation becomes impossible for a predetermined period.

Figure 11:
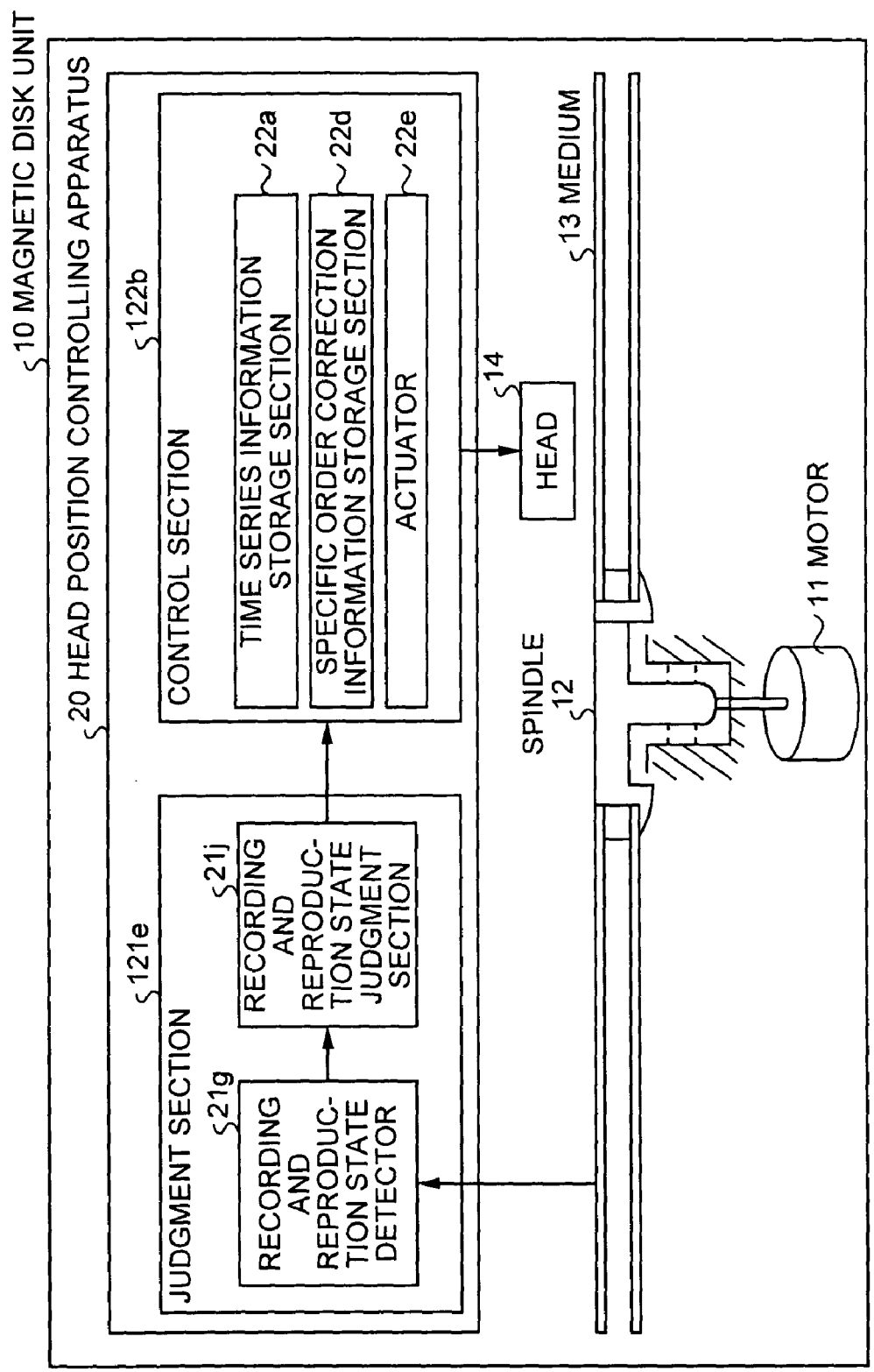
FIG. 11 is a block diagram of a magnetic disk unit according to a fifth embodiment of the present invention.

FIG. 11 illustrates the magnetic disk unit 10 according to the fifth embodiment. This magnetic disk unit 10 includes the head position control apparatus 20. The head position control apparatus 20 includes a judgment section 121e and the control section 122b. Thus, the control section 122b has same functions as in the second embodiment.

The judgment section 121e judges that the gyroscopic moment is out of a predetermined range, if it is not possible to perform the read-write operation continuously for a predetermined period. The judgment section 121e includes the recording and reproduction state detector 21g and a recording and reproduction state judgment section 21j. The recording and reproduction state detector 21g as in the fourth embodiment. The recording and reproduction state judgment section 21j judges whether it is not possible, continuously for a predetermined period, to perform the read-write operation.

Figure 12:
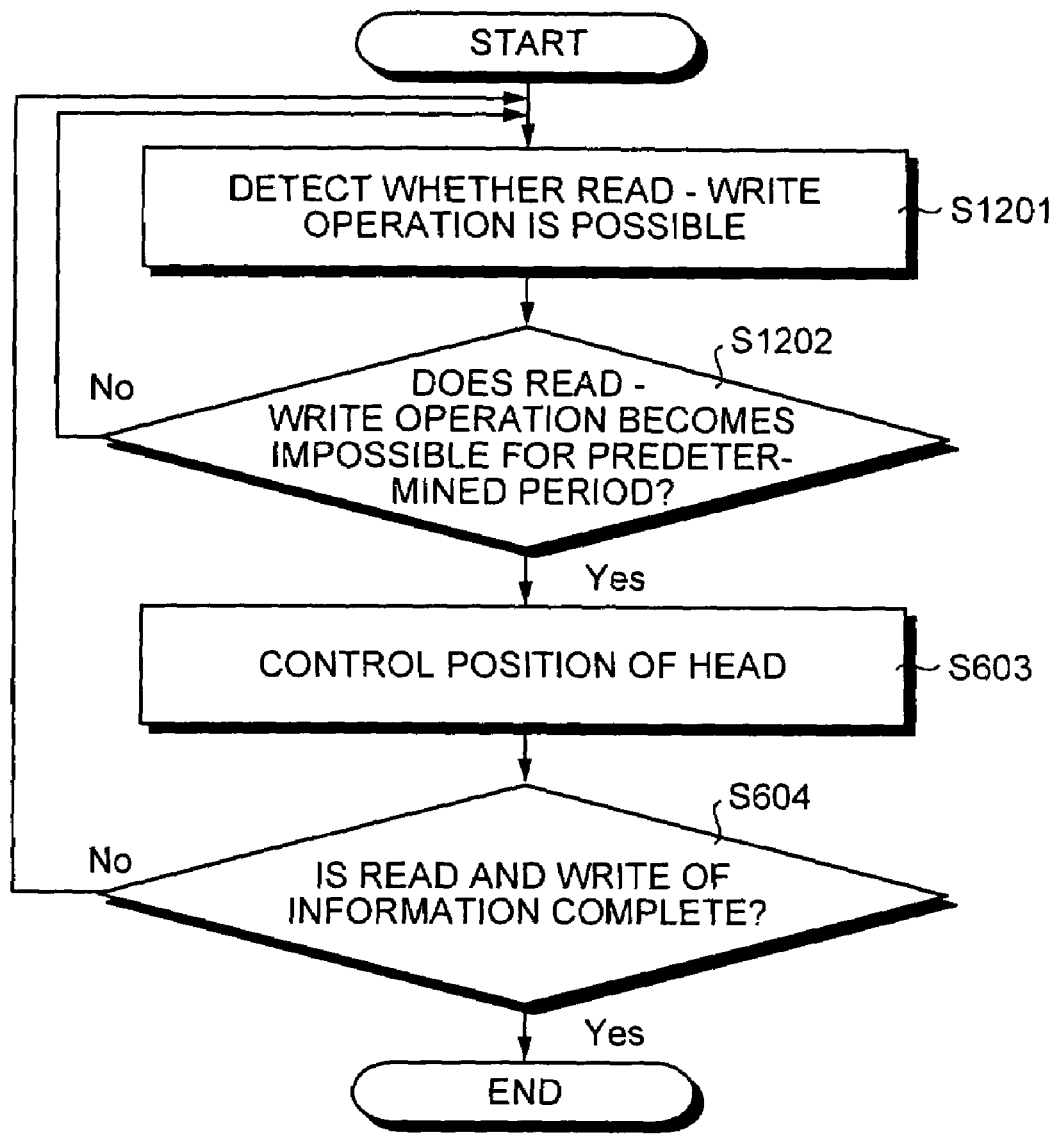
FIG. 12 is a flowchart of a head position control process according to the fifth embodiment.
Figure 13:
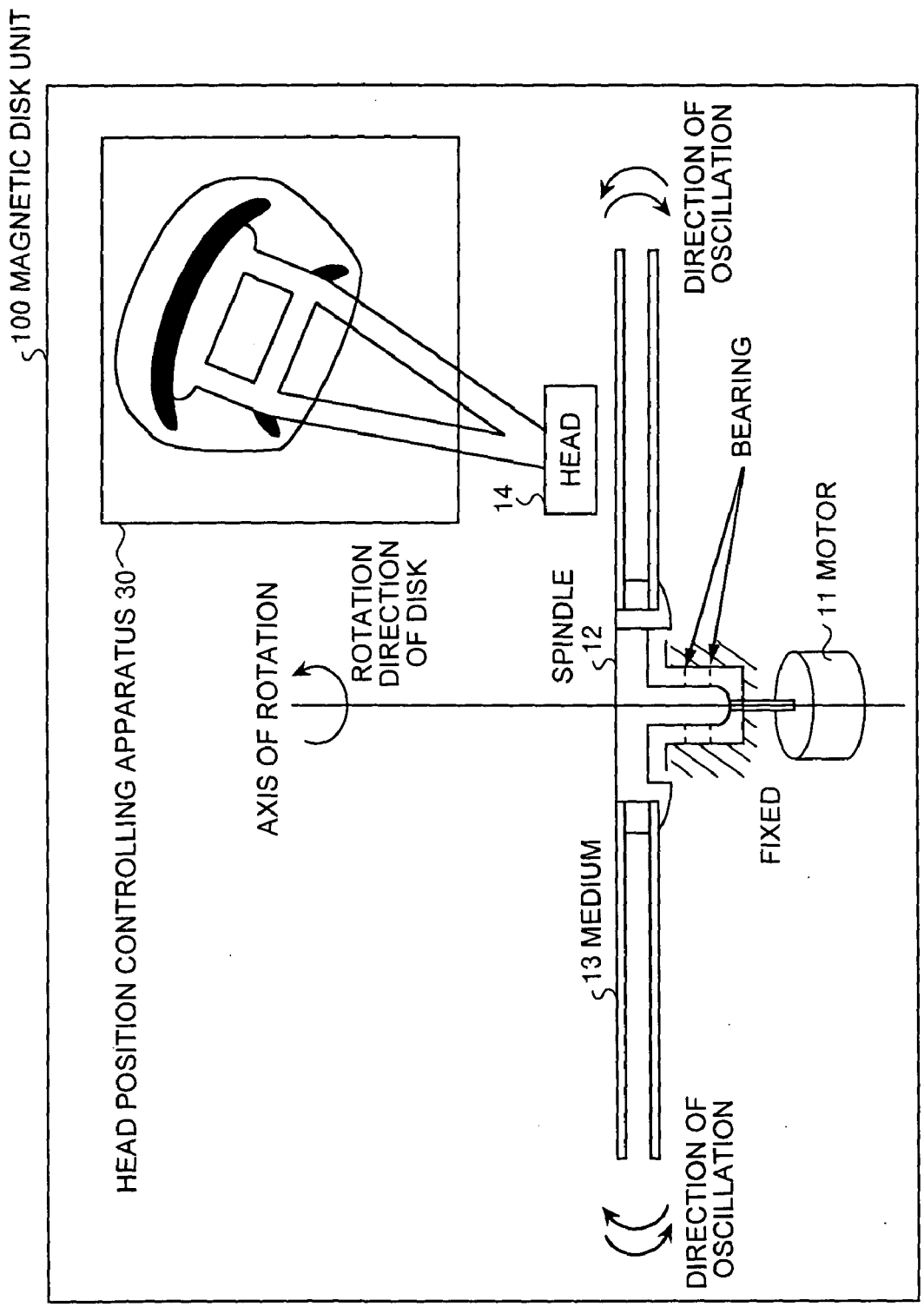
FIG. 13 is a block diagram of a conventional magnetic disk unit.

FIG. 12 is a flowchart of a head position control process executed by the head position control apparatus 20 according to the fifth embodiment. The recording and reproduction state detector 21g detects whether the read-write operation is possible (step S1201). The recording and reproduction state judgment section 21j judges whether the read-write operation becomes impossible continually for a predetermined period (step S1202). If the recording and reproduction state judgment section 21j judges that the read-write operation becomes impossible continually for a predetermined period, then the process at steps S603 and S604 is performed.

Thus, if the read-write operation becomes impossible continuously for the predetermined period, the position of the head 14 on the medium 13 is controlled by carrying out the repeat control or by using the compression filter. As a result, the head 14 can be positioned at an appropriate position on the medium 13 irrespective of the gyroscopic moment of the spindle 12 and the medium 13.

Of the respective processing explained in the embodiments, all of or a part of the processing as being performed automatically may be performed manually, or all of or a part of the processing explained as being performed manually may be performed automatically by a known method. In addition, the information including the processing procedure, the control procedure, specific names, and various data and parameters mentioned in the specification and drawings may be optionally changed, unless otherwise specified.

The respective components in the respective apparatus are functional, and it is not required that these are physically constructed as shown in the figures. In other words, the specific mode of distribution and integration of the respective apparatus is not limited to those shown in the figures, and all of or a part thereof may be constructed by distributing or integrating the respective apparatus in an optional unit functionally or physically, corresponding to the various loads and the use state. Further, all of or an optional part of the respective processing functions performed in the respective apparatus are realized by a Central Processing Unit (CPU) and a computer program analyzed and executed by the CPU, or may be realized as hardware by the wired logic.

According to one aspect of the present invention, it is judged whether the gyroscopic moment that causes the spindle or the medium to incline is out of the predetermined range. If it is judged that the gyroscopic moment is out of the predetermined range, the position of the head is controlled to compensate for the inclination of the spindle. As a result, the head can be positioned at an appropriate position on the medium irrespective of the gyroscopic moment of the spindle and the medium.

Moreover, whether the gyroscopic moment is out of the predetermined range is detected based on an inclination of the spindle. As a result, whether the gyroscopic moment is out of the predetermined range can be detected accurately.

Furthermore, whether the gyroscopic moment is out of the predetermined range is detected based on a change in the revolution speed of the spindle. As a result, whether the gyroscopic moment is out of the predetermined range can be detected accurately.

Moreover, whether the gyroscopic moment is out of the predetermined range is detected based on amplitude of the orders in the RRO of the spindle that affects read and write of information on the medium. As a result, whether the gyroscopic moment is out of the predetermined range can be detected accurately.

Furthermore, whether the gyroscopic moment is out of the predetermined range is detected based on whether the read-write operation is possible. If the read-write operation is not possible, it is judged that the gyroscopic moment is out of the predetermined range. As a result, whether the gyroscopic moment is out of the predetermined range can be detected accurately and at low cost.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A head position control apparatus that controls a position of a head that performs read and write of information with respect to a medium rotated and driven by a spindle, the spindle including a hydrodynamic bearing, comprising:
   a judgment unit that judges whether gyroscopic moment of the spindle is out of a predetermined range; and
   a control unit that controls the position of the head to compensate for the inclination of the spindle upon a judgment by the judgment unit that the gyroscopic moment is out of the predetermined range.

2. The head position control apparatus according to claim 1, further comprising a detecting unit that detects an inclination of the spindle, and if the inclination detected exceeds a predetermined threshold the judgment unit judges that the gyroscopic moment is out of the predetermined range.

3. The head position control apparatus according to claim 1, further comprising a detecting unit that detects a change in the revolution speed of the spindle, and if the change in the revolution speed detected exceeds a predetermined threshold the judgment unit judges that the gyroscopic moment is out of the predetermined range.

4. The head position control apparatus according to claim 1, further comprising a detecting unit that detects an amplitude of respective orders in a repeatable runout of the spindle, and if an amplitude of a specific order, which affects read and write of information, exceeds a predetermined threshold, the judgment unit judges that the gyroscopic moment is out of the predetermined range.

5. The head position control apparatus according to claim 1, further comprising a detecting unit that detects whether it is possible to read and write information from or into the medium, and if a state that read and write of information from or into the medium occurs repetitively in a predetermined cycle, the judgment unit judges that the gyroscopic moment is out of the predetermined range.

6. The head position control apparatus according to claim 1, further comprising a detecting unit that detects whether it is possible to read and write information from or into the medium, and if a state that read and write of information from or into the medium continue for a predetermined period, the judgment unit judges that the gyroscopic moment is out of the predetermined range.

7. The head position control apparatus according to claim 1, wherein the control unit calculates a phase correction quantity and an amplitude correction quantity with respect to a basic repeatable runout of the spindle, and controls the position of the head to compensate for the inclination of the spindle based on the phase correction quantity and the amplitude correction quantity, wherein
   the basic repeatable runout of the spindle is obtained by a predetermined oscillation test performed in advance.

8. The head position control apparatus according to claim 1, wherein the control unit controls the position of the head by executing a repeat control.

9. The head position control apparatus according to claim 1, wherein the control unit controls the position of the head by using a compression filter.

10. The head position control apparatus according to claim 7, wherein the control unit controls the position of the head to compensate for the inclination of the spindle resulting from the repeatable runout of a specific order, which affects read and write of information, of the respective orders in the repeatable runout of the spindle.

11. The head position control apparatus according to claim 8, wherein the control unit controls the position of the head to compensate for the inclination of the spindle resulting from the repeatable runout of a specific order, which affects read and write of information, of the respective orders in the repeatable runout of the spindle.

12. The head position control apparatus according to claim 9, wherein the control unit controls the position of the head to compensate for the inclination of the spindle resulting from the repeatable runout of a specific order, which affects read and write of information, of the respective orders in the repeatable runout of the spindle.

13. The head position control apparatus according to claim 7, wherein the control unit controls the position of the head to compensate for the inclination of the spindle resulting from the repeatable runout of a specific order, which affects read and write of information, and whose amplitude exceeds the predetermined threshold, of the respective orders in the repeatable runout of the spindle.

14. The head position control apparatus according to claim 8, wherein the control unit controls the position of the head to compensate for the inclination of the spindle resulting from the repeatable runout of a specific order, which affects read and write of information, and whose amplitude exceeds the predetermined threshold, of the respective orders in the repeatable runout of the spindle.

15. The head position control apparatus according to claim 9, wherein the control unit controls the position of the head to compensate for the inclination of the spindle resulting from the repeatable runout of a specific order, which affects read and write of information, and whose amplitude exceeds the predetermined threshold, of the respective orders in the repeatable runout of the spindle.

16. A method of controlling a position of a head that performs read and write of information with respect to a medium rotated and driven by a spindle, the spindle including a hydrodynamic bearing, comprising:
   judging whether gyroscopic moment of the spindle is out of a predetermined range; and
   controlling the position of the head to compensate for the inclination of the spindle upon a judgment at the judging that the gyroscopic moment is out of the predetermined range.

17. The head position control method according to claim 16, further comprising detecting an inclination of the spindle, and if the inclination detected exceeds a predetermined threshold, it is judged at the judging that the gyroscopic moment is out of the predetermined range.

18. The head position control method according to claim 16, further comprising detecting a change in the revolution speed of the spindle, and if the change in the revolution speed detected exceeds a predetermined threshold, it is judged at the judging that the gyroscopic moment is out of the predetermined range.

19. The head position control method according to claim 16, further comprising detecting an amplitude of respective orders in the repeatable runout of the spindle, and if the amplitude of a specific order, which affects read and write of information, exceeds a predetermined threshold, it is judged at the judging that the gyroscopic moment is out of the predetermined range.

20. The head position control method according to claim 16, further comprising detecting whether it is possible to read and write information from or into the medium, and if a state that read and write of information from or into the medium occurs repetitively in a predetermined cycle, it is judged at the judging that the gyroscopic moment is out of the predetermined range.

21. The head position control method according to claim 16, further comprising detecting whether it is possible to read and write information from or into the medium, and if a state that read and write of information from or into the medium continue for a predetermined period, it is judged at the judging that the gyroscopic moment is out of the predetermined range.

22. The head position control method according claim 16, further comprising:
   calculating the phase correction quantity and the amplitude correction quantity with respect to the basic repeatable runout of the spindle, wherein the basic repeatable runout of the spindle is obtained by a predetermined oscillation test performed in advance; and
   controlling the position of the head to compensate for the inclination of the spindle based on the phase correction quantity and the amplitude correction quantity.

23. The head position control method according to claim 16, wherein the controlling includes controlling the position of the head by executing repeat control.

24. The head position control method according to claim 16, wherein the controlling includes controlling the position of the head by using a compression filter.

25. The head position control method according to claim 22, wherein the controlling includes controlling the position of the head to compensate for the inclination of the spindle resulting from the repeatable runout of a specific order, which affects read and write of information, of the respective orders in the repeatable runout of the spindle.

26. The head position control method according to claim 23, wherein the controlling includes controlling the position of the head to compensate for the inclination of the spindle resulting from the repeatable runout of a specific order, which affects read and write of information, of the respective orders in the repeatable runout of the spindle.

27. The head position control method according to claim 24, wherein the controlling includes controlling the position of the head to compensate for the inclination of the spindle resulting from the repeatable runout of a specific order, which affects read and write of information, of the respective orders in the repeatable runout of the spindle.

28. The head position control method according to claim 22, wherein the controlling includes controlling the position of the head to compensate for the inclination of the spindle resulting from the repeatable runout of a specific order, which affects read and write of information, and whose amplitude exceeds the predetermined threshold, of the respective orders in the repeatable runout of the spindle.

29. The head position control method according to claim 23, wherein the controlling includes controlling the position of the head to compensate for the inclination of the spindle resulting from the repeatable runout of a specific order, which affects read and write of information, and whose amplitude exceeds the predetermined threshold, of the respective orders in the repeatable runout of the spindle.

30. The head position control method according to claim 24, wherein the controlling includes controlling the position of the head to compensate for the inclination of the spindle resulting from the repeatable runout of a specific order, which affects read and write of information, and whose amplitude exceeds the predetermined threshold, of the respective orders in the repeatable runout of the spindle.

* * * * *